United States Patent [19]

Schutz

[11] 4,444,593

[45] Apr. 24, 1984

[54] RAPID SETTING ACCELERATORS FOR CEMENTITIOUS COMPOSITIONS

[75] Inventor: Raymond J. Schutz, Sedalia, Colo.

[73] Assignee: Protex Industries, Inc., Denver, Colo.

[21] Appl. No.: 463,259

[22] Filed: Feb. 2, 1983

Related U.S. Application Data

[63] Continuation-in-part of Ser. No. 317,008, Nov. 2, 1981, abandoned.

[51] Int. Cl.$^3$ ................................................ C04B 7/35
[52] U.S. Cl. ....................................... 106/89; 106/315
[58] Field of Search ................................. 106/89, 315

[56] References Cited

U.S. PATENT DOCUMENTS

4,209,335  6/1980  Katayama et al. ................. 106/315

FOREIGN PATENT DOCUMENTS

196592  6/1967  U.S.S.R. ............................... 106/315

OTHER PUBLICATIONS

Lea & Desch, The Chemistry of Cement and Concrete, Edward Arnold (Publishers) Ltd., London, 1956, p. 252.

*Primary Examiner*—James Poer

[57] ABSTRACT

A mixture comprised of an alkali metal carbonate and an inorganic salt of ferric iron, other than ferric phosphate, is an accelerator for cementitious compositions and is particularly useful for shotcrete and hand-applied mortar. The preferred alkali metal carbonates are sodium carbonate and potassium carbonate and the preferred ferric iron salts are ferric sulfate, ferric chloride and ferric nitrate. The mixture achieves initial set times of at most about 3 minutes and final set times of at most about 10 minutes. Both initial and final set times are shorter than predicted by simply averaging the corresponding set times of both components when used alone.

6 Claims, 2 Drawing Figures

RAPID SETTING ACCELERATORS FOR CEMENTITIOUS COMPOSITIONS

CROSS REFERENCE TO RELATED APPLICATION

This application is a continuation-in-part of Applicant's co-pending Ser. No. 317,008 filed Nov. 2, 1981, now abandoned.

TECHNICAL FIELD

This invention relates to setting accelerators for cementitious compositions, particularly shotcrete. The invention further relates to cementitious compositions which incorporate these accelerators.

Background Art

Prior Art Statement

Accelerators utilized in rapid setting cementitious compositions, such as shotcrete, are usually comprised of sodium aluminate, sodium carbonate, combinations of these two or sodium silicate. However, all of these accelerators are caustic, causing burns and dermatitis to those working with cement containing these accelerators. Moreover, accelerators based solely on sodium aluminate, although they impart a good initial set, impart a very slow final set to the cementitious composition. Sodium aluminate also lowers the resistance of mortars and concretes to sulfate and chemical attack. Sodium carbonate accelerators have poor initial set characteristics, and although they will reduce drying shrinkage, they also reduce the ultimate strength of the resulting concrete. Similarly, concretes containing sodium silicate accelerators exhibit low ultimate strengths.

Trivalent iron salts have been investigated as potential accelerators for cementitious compositions. Rosenberg, T. I., et al., "Investigation of Trivalent Iron Salts as Admixtures Accelerating the Hardening of Concrete", *Intl. Symp. Admix. Mortar & Concr.* Belg 67; Report 111-1V/10, pp. 169-180, report that ferric sulfate, ferric chloride and ferric nitrate accelerate the initial hardening of cement. Although an accelerated initial hardening of a cement may allow for a successful spray application of the cement, as they state, such cement would serve no useful purpose because of the long final set required for the cement and the slow strength development.

Several patents disclose rapid setting accelerators for cement. For example, U.S. Pat. No. 4,066,469 to Shiel, et al. discloses an ultra-rapid hardening Portland cement which contains at least one acid salt, other than phosphorous, of an alkali metal, ammonium or an organic base, e.g., an amine, and cement which has been ground to 3,000–7,000 cm$^2$/g. U.S. Pat. No. 2,918,385 to Arpin, et al. discloses a quick setting cement comprised of Portland cement, kaolin and anhydrous calcium sulfate. U.S. Pat. No. 3,782,991 to Burge, although directed toward an additive for improving the quality of a cement mixture, discloses as setting accelerators alkanolamines, alkali silicates and alkaline or alkali reacting compounds such as hydroxides, carbonates and sodium aluminate. U.S. Pat. No. 2,995,454 to Handl teaches a dry binder for cement which is comprised of anhydrite, an alkali metal silicate and a non-alkali metal salt, e.g., aluminum, iron, copper, zinc, manganese, chromium or nickel. U.S. Pat. No. 3,864,141 to Uchikawa, et al. discloses a process for regulating the setting time of hydraulic cement with anhydrite with or without hemihydrate and organic compounds such as sugars, carboxylic acids, ligninsulfonates, etc. and inorganic compounds such as water-soluble phosphates, sodium hydrogen carbonate may be added. U.S. Pat. No. 4,209,335 to Katayama, et al. discloses a process for agglomerating sludge and sewage and discloses the use of additives including a mixture of an alkali metal carbonate and ferric sulfate which react with each other upon hydration to form an alkali metal sulfate, ferric hydroxide and carbon dioxide. The metal sulfate then reacts with cement components to form ettringite, a material having a high water of crystallization and serving to bind up the waste material. The carbon dioxide also reacts with cement components to form calcite and enhance the setting. The agglomerated product of Katayama is about as strong as styrofoam and is not "set" concrete as defined by ASTM Standards. The Katayama disclosure requires the alkali metal carbonate and ferric sulfate to react with each other and does not disclose or suggest the use of these additives as set accelerators.

The accelerators of the present invention are comprised of an alkali metal carbonate and an inorganic salt of ferric iron. This mixture of accelerators unexpectedly acts together to achieve initial and final setting times which are faster than predicted by averaging the setting times obtained by each of the two components. Moreover, the accelerators are noncaustic and the cementitious compositions incorporating these accelerators generally obtain an initial and final set in fewer than about ten minutes and the resulting rapid setting concrete has a greater strength than rapid setting concrete utilizing prior art accelerators.

Disclosure of the Invention

The rapid set accelerators for cementitious compositions of this invention are comprised of an alkali metal carbonate and an inorganic salt of ferric iron. The accelerators are particularly useful when it is desirable to obtain both an initial and a final set of the cementitious composition within about 10 minutes after the hydration of the cementitious composition. Thus, the accelerators are particularly useful in the preparation of shotcrete or hand-applied mortar. Additionally, hardened cementitious compositions containing these accelerators have improved strength characteristics compared to rapid setting cementitious compositions which utilize accelerators comprised of sodium carbonate and sodium aluminate. Moreover, because the acclerators are noncaustic, the hazards of burns and dermatitis to the people handling the cementitious compositions are greatly reduced compared to cementitious compositions containing conventional rapid set accelerators, e.g., sodium carbonate and sodium aluminate.

When utilized alone, neither component caused the cementitious composition to achieve an initial set within three minutes and final set within nine minutes as described in ASTM C-266-77, "Time of Setting of Hydraulic Cement by Gillmore Needles", and proposed ASTM Committee C 09.03.08.07, "Compatibility of Shotcrete Accelerators and Portland Cement by Use of Gillmore Needles". Both references are incorporated herein. When utilized alone, the alkali metal carbonates will not obtain an initial set within three minutes and they will not obtain a final set within nine minutes. Although ferric iron salts, e.g., ferric sulfate, when utilized alone, will obtain an initial set within three minutes, the final set will be much longer than nine minutes. However, when both components are used together as an accelerator, they unexpectedly act together as demonstrated in FIGS. 1 and 2 to obtain initial and final set times which are not only within the prescribed times, but which are generally less than the set times that would be expected by a simple averaging of each component's set times. As used herein, the term "rapid-setting" as applied to the accelerators of this invention shall mean achieving an initial set at least as short as the average of the initial set times achievable by the same concentration of each accelerator component alone, and a final set at least as short as the average of the final set times achievable by the same concentration of each accelerator component alone.

DETAILED DESCRIPTION OF THE PREFERRED EMBODIMENTS

Figure 1:
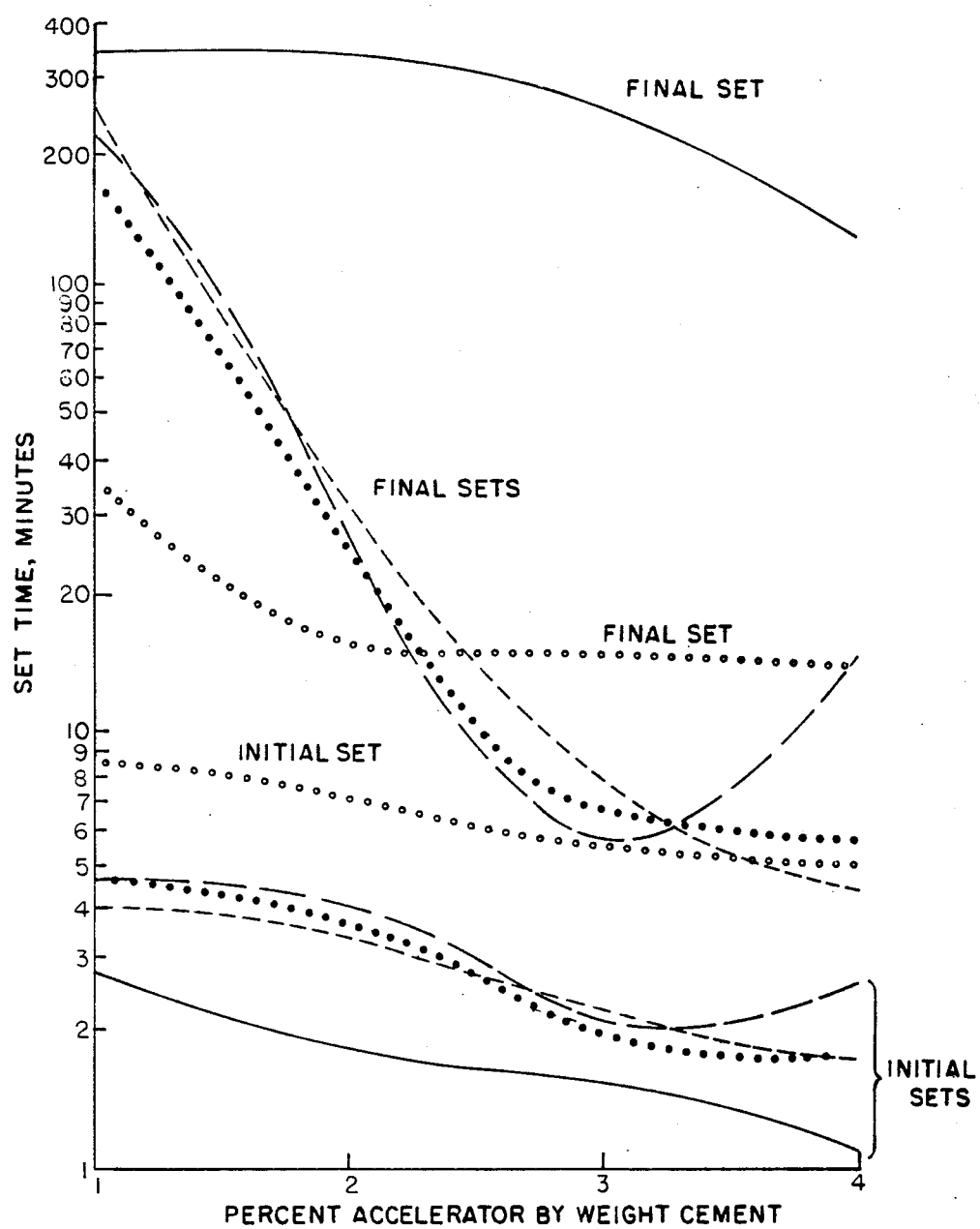
FIG. 1 is a semilogarithmic graphic representation of the setting times of Portland cement containing different admixtures of sodium carbonate and/or ferric sulfate.

The accelerators of the present invention are useful in cementitious compositions wherein rapid initial and final set times are desired. Such compositions include hand-applied mortars or shotcrete. The cement can be either Portland cement or a high aluminous cement, for example, that used in refractory applications. It is well known that alkali metal carbonates and ferric salts react with each other upon hydration to form ferric oxide (or hydroxide), carbon dioxide and sodium sulfate, none of which are set accelerators. When dispersed in the dry cement prior to hydration, however, upon hydration the accelerator components react preferentially with the cement components, the principal reaction being to form a hydrosulfoaluminoferrite ($3CaO Al_2O_3 Fe_2O_3 \cdot CaSO_4 3H_2O$) which occurs, when appropriate proportions of additives are present, so quickly that all the sulfate is taken up and none is left free to combine with the calcium aluminate present in the cement to form ettringite. The alkali metal carbonate reacts with calcium in the cement to form sodium hydroxide and calcium carbonate, and the sodium hydroxide formed reacts with previously formed calcium sulfate (gypsum) to yield sodium sulfate. When the alkali metal carbonate is present in sufficient amounts, all the gypsum is thus removed from the mixture, causing a flash set. Thus, assuming appropriate proportions of water, accelerator components and cement, the combination acts to provide both a quick initial and final set. To prevent the accelerator components from reacting with each other to any appreciable degree (such reactions being evidenced by small rust-colored spots resulting from the formation of iron oxide), it is important that the cement be allowed to set as rapidly as possible, such as in the environment of a hand-applied mortar or dry process shotcrete. It is also apparent from the rapid setting achieved by these accelerators that the cement mixture must be utilized quickly after hydration, again in a shotcrete, hand-applied mortar, or other process in which the cement is placed in position to harden immediately after hydration.

The accelerator is incorporated into a cementitious composition in an amount which causes the cementitious composition to attain the initial and a final set time desired for the particular application of the cementitious composition. Generally, the accelerator is added in an amount which is sufficient to attain a final set of the cementitious composition within about 60 minutes, more preferably within 30 minutes and most preferably within about 10 minutes. Generally, the accelerator will be utilized in an amount from about 0.5 weight percent to about 10 weight percent of the cementitious composition, preferably in an amount from about 1 to about 5 percent by weight, and more preferably from about 3 to about 4 percent by weight of the cementitious composition.

The preferred alkali metal carbonates are sodium and potassium carbonates. Sodium carbonate is the most preferred. Since the alkali metal carbonate is primarily responsible for the final set of the cementitious composition, it should be utilized in an amount which is sufficient, in conjunction with the ferric salt, to enable the final set to occur within about 60 minutes, more preferably within about 30 minutes, and most preferably within about 10 minutes of the hydration of the cementitious composition. Generally, the alkali metal carbonate will form from about 20 to about 80 percent of the accelerator and more preferably will form less than about 50 percent of the accelerator with from about 30 to about 40 percent being the most preferred.

The preferred inorganic salts of ferric iron are ferric acid salts, excluding ferric phosphate, such as ferric sulfate, ferric chloride and ferric nitrate. Ferric sulfate and ferric chloride are more preferred. Since ferric chloride (as well as the ferric nitrate) may be corrosive to reinforcing material, ferric sulfate is most preferred. The ferric iron component is utilized in an amount which is sufficient, when used in conjunction with the alkali metal carbonate, to cause the cementitious composition to attain an initial set within about 10 minutes and more preferably within about 3 minutes. Additionally, since the ferric iron component is responsible for reducing the alkalinity of the sodium carbonate and, to a much lesser extent, the alkaline reaction products formed during the hydration and hardening of the cementitious composition, it is further utilized in an amount sufficient to obtain a desired pH. The amount of the ferric iron salt utilized to achieve a particular pH will be dependent upon the particular salt and the particular cement. For example, to achieve a pH of about 7 for an accelerator used in a Type 1 Portland cement shotcrete, about 60 percent of the accelerator is comprised of ferric sulfate. Generally, the ferric iron component of the accelerator comprises from about 80 to about 20 percent of the accelerator, more preferably at least 50 percent, and most preferably from about 60 to about 70 percent of the accelerator.

As is known by those skilled in the art, many factors may affect the dosage of accelerator, e.g., temperature, source and type of cement, water content of the aggregate and end result desired. For example, to maintain a given degree of acceleration, the dosage of the accelerator generally must be increased as temperature decreases. Additionally, the induced acceleration of a cement caused by a given dosage of an accelerator may be less in a slower setting type cement as compared to a faster setting type cement. Thus, as is often done with shotcrete, it may be desirable to test the compatibility of the ratio and dosage of the accelerators of the present invention with the particular cementitious compositions being utilized. Proposed ASTM test, "Compatibility of Shotcrete Accelerators and Portland Cement by Use of Gillmore Needles" is a method for testing such compatibility.

The cementitious compositions are not critical and appropriate formulations are know by those skilled in the art. In addition to the accelerator, the cementitious composition generally will contain from about 10 to about 35 percent cement and from about 65 to about 90 percent aggregate. Sufficient water is added to obtain a cement to water ratio between about 0.28 and about 0.60.

EXAMPLES

Example 1

Fifteen samples of Type 1 Portland cement were prepared utilizing different amounts of sodium carbonate and ferric sulfate. Each sample contained Type 1 Portland cement, as described in ASTM C-150, which is incorporated herein by reference. The amount of accelerator varied from about 1 to about 3 percent by weight of the cement mixture and the components of accelerators were as follows (given as weight percentage of total accelerator):

| Sample 1 | 0 | $Na_2CO_3$ | 100 | $Fe_2(SO_4)_3$ |
| Sample 2 | 33.3 | $Na_2CO_3$ | 67.7 | $Fe_2(SO_4)_3$ |
| Sample 2 | 40 | $Na_2CO_3$ | 60 | $Fe_2(SO_4)_3$ |
| Sample 4 | 50 | $Na_2CO_3$ | 50 | $Fe_2(SO_4)_3$ |
| Sample 5 | 100 | $Na_2CO_3$ | 0 | $Fe_2(SO_4)_3$ |

Water was added in an amount sufficient to obtain a water to cement ratio of about 0.30.

Figure 2:
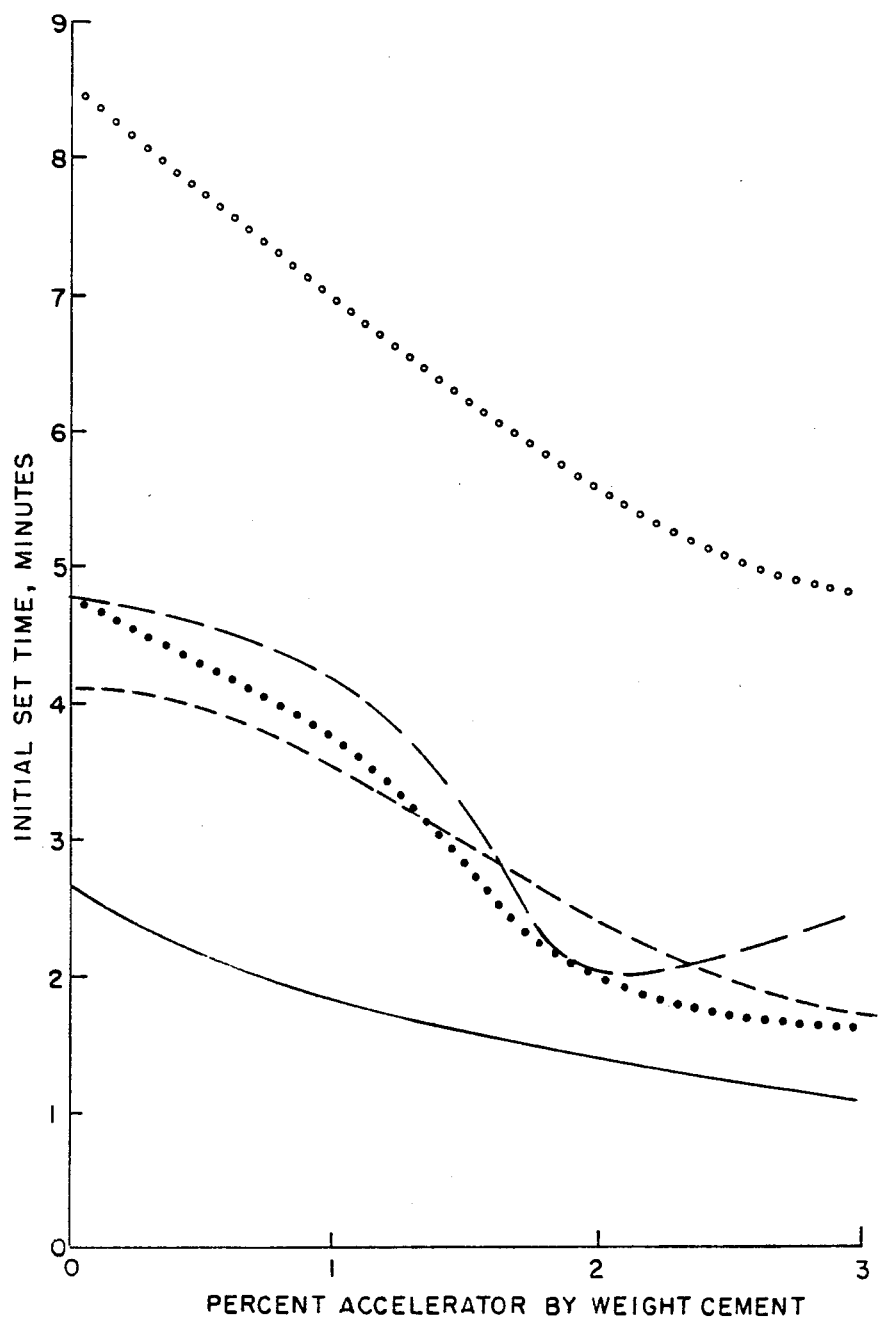
FIG. 2 is a linear graphic representation of the initial setting times of FIG. 1.

The initial and final setting time for each sample was measured in accordance with ASTM test C-266-77, "Time of Setting of Hydraulic Cement by Gillmore Needles." The results are given in FIG. 1 and in FIG. 2 which is a linear representation of the initial setting times given in FIG. 1.

The results demonstrate that the components of mixture unexpectedly act together to obtain a final setting time that is less than the time required when either component is utilized alone and to attain both final and initial setting times, when the accelerator mixture comprises greater than about 1 percent by weight of the cement, which are less than would be expected by averaging the individual setting times of the components. Thus, the components of the accelerators of this invention act together in a synergistic manner.

Example 2

To determine setting times and strength development, several samples of a concrete mixture utilizing the accelerators of the present invention were formulated and applied as dry process shotcrete. Additionally, comparative samples of the same concrete mixture, containing no accelerator and containing a prior art accelerator of sodium carbonate and sodium aluminate, were also applied as dry process shotcrete. The concrete mixture utilized in each sample was prepared in accordance with ACI (American Cement Institute) 506.2-77 and had the following composition:

| Portland Cement, ASTM C-150, Type I | 846 lbs. |
| Sand, ASTM C-33 Concrete Aggregates | 2032 lbs. |
| Coarse Aggregate, ASTM C-33 | 870 lbs. |
| Accelerator | varied with each sample |

The composition and amount of the accelerator in each sample were as follows:

| Sample | (% of Components) | (Wt. % of Concrete) |
|---|---|---|
| 1 (Control) | None | 0 |
| 2 a (Prior Art) | | 1 |
| 2 b | (23) $AlNaO_2$ | 2 |
| 2 c | (73) $Na_2CO_3$ | 3 |
| 3 a | (50) $Na_2CO_3$ | 1 |
| 3 b | (50) $Fe_2(SO_4)_3$ | 2 |
| 3 c | | 3 |
| 4 a | (60) $Na_2CO_3$ | 1 |
| 4 b | (40) $Fe_2(SO_4)_3$ | 2 |
| 4 c | | 3 |

Each sample of dry shotcrete was mixed in a continuous volumetric batcher and mixer which had been calibrated to deliver dry concrete conforming to ASTM Specification C-685-80, "Concrete Made By Volumetric Batching and Continuous Mixing." The dry shotcrete was conveyed through a hose by a continuous feed gun with water being injected into the mixture at the nozzle in accordance with standard practice. Although the cement to water ratio cannot be regulated exactly, to the extent possible, the two were added together to obtain a ratio of cement to water of about 0.3. Each sample of shotcrete was gunned into 18"×18"×6" vertically mounted steel molds. Immediately after the applications of the shotcretes, measurements of the setting times were initiated and taken in accordance with ASTM C-403-77, "Test for Time of Setting of Concrete Mixtures by Penetration Resistance." Additionally, the strength of the resulting concrete was measured at intervals of 0.33, 1, 3, 7, 28 and 56 days. Standard cores, measuring 3" in diameter and 6" in height, were taken immediately prior to each test interval. Both the coring and testing of strength were done in accordance with ASTM C-42-77, "Obtaining and Testing Drilled Cores and Sawed Beams of Concrete."

The initial and final setting times for each sample are given in Table 1 and the strengths developed by each sample are given in Table 2.

TABLE 1

| Sample | Initial Set Time, minutes | Final Set Time, minutes |
|---|---|---|
| 1 (Control) | 40 min 15 sec | 136 min 10 sec |
| 2 a (Prior Art) | 3 min 20 sec | 84 min |
| 2 b | 4 min 20 sec | 9 min 15 sec |
| 2 c | 4 min 0 sec | 6 min 48 sec |
| 3 a | 4 min 30 sec | 63 min |
| 3 b | 1 min 12 sec | 11 min 30 sec |
| 3 c | 1 min 12 sec | 5 min 30 sec |
| 4 a | 3 min 30 sec | 7 min 50 sec |
| 4 b | 1 min 30 sec | 7 min 50 sec |
| 4 c | 0 min 45 sec | 3 min 18 sec |

TABLE 2

| 1 (Control) | 2970 | 5440 | 5970 | 6590 | 7040 | 8070 |
| 2 a (Prior Art) | 2820 | 4110 | 4635 | 4750 | 5290 | 4720 |
| 2 b | 2380 | 3130 | 3355 | | 4440 | 4350 |
| 2 c | 2320 | 2430 | 2765 | 2830 | 3240 | 3830 |
| 3 a | 3490 | 4810 | 4810 | 5065 | 6020 | 5970 |
| 3 b | 2960 | 3430 | 3830 | 4005 | 4615 | 5780 |
| 3 c | 2300 | 2840 | 3165 | 3445 | 4010 | 4700 |
| 4 a | 3710 | 3990 | 4525 | 4680 | 5610 | 6130 |

TABLE 2-continued

| 4 b | 3070 | 3710 | 3960 | 4090 | 4805 | 5450 |
| 4 c | 2880 | 3420 | 3555 |      | 4350 | 4640 |

What is claimed is:

1. An improved process for shotcreting comprising:
   (1) hydrating a dry mixture consisting essentially of (a) cement and (b) set accelerators comprising an alkali metal carbonate and an inorganic salt of ferric iron other than ferric phosphate, said set accelerators being sufficiently dispersed in the cement mixture to sustantially prevent them from reacting with each other by causing them to react with components of the cement;
   (2) within at most 10 minutes after said hydration, affixing the hydrated mixture into the desired conformation.

2. The process of claim 1 in which the alkali metal carbonate is selected from the group consisting of sodium carbonate and potassium carbonate.

3. The process of claim 1 in which the inorganic ferric iron salt is selected from the group consisting of ferric chloride and ferric nitrate.

4. The process of claim 1 in which the inorganic ferric iron salt is ferric sulfate.

5. The process of claim 1 in which the set accelerators are present in an amount of about 0.5 weight percent to about 10 weight percent.

6. The process of claim 1 in which the accelerator components are present in an amount from about 0.5 weight percent to about 5 weight percent.

* * * * *